US012639841B2

(12) United States Patent
Keh et al.

(10) Patent No.: US 12,639,841 B2
(45) Date of Patent: May 26, 2026

(54) ELECTRONIC DEVICE AND METHOD FOR IMPROVING FAR-FIELD PERFORMANCE OF CAMERA

(71) Applicant: Samsung Electronics Co., Ltd., Suwon-si (KR)

(72) Inventors: Yongchan Keh, Suwon-si (KR); Byeonghoon Park, Suwon-si (KR); Kihuk Lee, Suwon-si (KR); Hwayong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 18/448,575

(22) Filed: Aug. 11, 2023

(65) Prior Publication Data

US 2023/0386061 A1     Nov. 30, 2023

Related U.S. Application Data

(63) Continuation of application No. PCT/KR2022/000999, filed on Jan. 19, 2022.

(30) Foreign Application Priority Data

Mar. 25, 2021   (KR) ........................ 10-2021-0038724

(51) Int. Cl.
*G06T 7/586*          (2017.01)
*G06T 5/00*          (2024.01)
(Continued)

(52) U.S. Cl.
CPC ............... *G06T 7/586* (2017.01); *G06T 5/70* (2024.01); *H04N 23/56* (2023.01); *H04N 23/95* (2023.01)

(58) Field of Classification Search
None
See application file for complete search history.

(56) References Cited

U.S. PATENT DOCUMENTS

2012/0081360 A1     4/2012   Uehira et al.
2013/0188022 A1     7/2013   Katz et al.
(Continued)

FOREIGN PATENT DOCUMENTS

CN          111598071 A   *   8/2020   ............. H04N 23/54
CN          112066907 A   *   12/2020   ......... G02B 27/4205
(Continued)

OTHER PUBLICATIONS

English translation of CN-111598071-A. (Year: 2020).*
(Continued)

*Primary Examiner* — Thomas D Lee
(74) *Attorney, Agent, or Firm* — Jefferson IP Law, LLP

(57) ABSTRACT

An electronic device is provided. The electronic device includes an optical output module, an image sensor configured to receive a reflected light that originates from a light output by the optical output module, and to obtain image data, a memory, and a processor operatively coupled to the optical output module, the image sensor, and the memory, wherein the processor is configured to control the optical output module to output a spotlight at a first time point, control the optical output module to output a floodlight at a second time point, produce a first depth map based on first image data associated with a first reflected light that originates from the spotlight, produce a second depth map based on second image data associated with a second reflected light that originates from the floodlight, and produce a third depth map based on the first depth map and the second depth map.

17 Claims, 12 Drawing Sheets

(51) Int. Cl.
G06T 5/70 (2024.01)
H04N 23/56 (2023.01)
H04N 23/95 (2023.01)

(56) References Cited

U.S. PATENT DOCUMENTS

| | | |
|---|---|---|
| 2014/0098223 A1 | 4/2014 | Murata et al. |
| 2014/0313292 A1 | 10/2014 | Xiong et al. |
| 2015/0009295 A1 | 1/2015 | Kim et al. |
| 2015/0055886 A1 | 2/2015 | Oh et al. |
| 2016/0146927 A1 | 5/2016 | Hudman |
| 2016/0212411 A1 | 7/2016 | Lindner et al. |
| 2017/0068319 A1 | 3/2017 | Viswanathan |
| 2017/0264884 A1 | 9/2017 | Chou et al. |
| 2017/0366713 A1 | 12/2017 | You et al. |
| 2017/0374352 A1 | 12/2017 | Horesh |
| 2019/0109977 A1 | 4/2019 | Dutton et al. |
| 2019/0339364 A1 | 11/2019 | Nash et al. |
| 2022/0043277 A1 | 2/2022 | Karafin et al. |
| 2022/0264074 A1* | 8/2022 | Richards ............. H04M 1/0264 |
| 2023/0076534 A1 | 3/2023 | Xu et al. |
| 2023/0078604 A1 | 3/2023 | Rein et al. |

FOREIGN PATENT DOCUMENTS

| | | | |
|---|---|---|---|
| JP | 2014-077668 A | 5/2014 |
| JP | 2018-510324 A | 4/2018 |
| JP | 6334861 B2 | 5/2018 |
| JP | 2020-169960 A | 10/2020 |
| KR | 10-2014-0123079 A | 10/2014 |
| KR | 10-2014-0145481 A | 12/2014 |
| KR | 10-2015-0004989 A | 1/2015 |
| KR | 10-1494066 B1 | 2/2015 |
| KR | 10-2015-0021353 A | 3/2015 |
| KR | 10-2015-0145251 A | 12/2015 |
| KR | 10-2016-0090464 A | 8/2016 |
| KR | 10-2017-0086570 A | 7/2017 |
| KR | 10-2018-0039674 A | 4/2018 |
| KR | 10-2019-0039667 A | 4/2019 |
| KR | 10-2020-0101803 A | 8/2020 |
| KR | 10-2022-0134753 A | 10/2022 |
| KR | 10-2458470 B1 | 10/2022 |
| WO | 2020/247195 A1 | 12/2020 |

OTHER PUBLICATIONS

English translation of CN-112066907-A. (Year: 2020).*
Korean Office Action with English translation dated Apr. 21, 2025; Korean Appln. No. 10-2021-0038724.
International Search Report with Written Opinion dated Apr. 25, 2022; International Appln. No. PCT/KR2022/000999.

* cited by examiner

200

210

PROCESSOR

OPTICAL OUTPUT MODULE ~220

IMAGE SENSOR ~230

MEMORY ~240

300

310

START

PRODUCE FIRST IMAGE DATA AND SECOND IMAGE DATA ～902

DETERMINE RELIABILITY VALUE FOR PIXEL OF SECOND IMAGE DATA ～904

DETERMINE VALID PIXEL AND INVALID PIXEL IN SECOND IMAGE DATA ～906

INPUT IMAGE DATA OF SECOND PIXEL TO IMAGE DATA OF FIRST PIXEL ～908

PRODUCE THIRD DEPTH MAP BY INTERPOLATING COMPOSITE DEPTH MAP ～910

END

ELECTRONIC DEVICE AND METHOD FOR IMPROVING FAR-FIELD PERFORMANCE OF CAMERA

CROSS-REFERENCE TO RELATED APPLICATION(S)

This application is a continuation application, claiming priority under § 365(c), of an International application No. PCT/KR2022/000999, filed on Jan. 19, 2022, which is based on and claims the benefit of a Korean patent application number filed on Mar. 25, 2021, in the Korean Intellectual Property Office, the disclosure of which is incorporated by reference herein in its entirety.

BACKGROUND

1. Field

The disclosure relates to an electronic device. More particularly, the disclosure relates to a method of improving a long-distance shooting performance of a camera.

2. Description of Related Art

As mobile communication technologies and hardware/software technologies have been developed, portable electronic devices (hereinafter, electronic devices) have been implemented to provide various functions beyond the conventional phone call function. For example, an electronic device may contain a camera disposed around or in a display, and may provide a photographing function and a video recording function.

At least one camera may be installed in the front side and the rear side of the electronic device. Recently, since technologies have been developed, three-dimensional information including distance data associated with a distance from the camera may be obtained, as well as a two-dimensional image of an object. For example, distance data between a camera and an object may be obtained by using a time of flight (ToF) camera.

The above information is presented as background information only to assist with an understanding of the disclosure. No determination has been made, and no assertion is made, as to whether any of the above might be applicable as prior art with regard to the disclosure.

SUMMARY

A conventional electronic device provides high quality of a resolution and depth value within a short distance. However, the performance of the electronic device may dramatically deteriorate outside or in a long distance due to a decrease in the amount of light per unit area and a decrease in a signal to noise ratio (SNR). In addition, in the case of an electronic device that uses a direct ToF, an operation distance may be extended but the resolution of a depth map may be decreased, which is drawback.

Aspects of the disclosure are to address at least the above-mentioned problems and/or disadvantages and to provide at least the advantages described below. Accordingly, an aspect of the disclosure is to improve a long-distance shooting performance while maintaining the existing resolution and SNR performance for operation performed within a short distance.

Additional aspects will be set forth in part in the description which follows and, in part, will be apparent from the description, or may be learned by practice of the presented embodiments.

In accordance with an aspect of the disclosure, an electronic device is provided. The electronic device includes an optical output module, an image sensor configured to receive reflected light that originates from light output by the optical output module, and to obtain image data, a memory, and a processor operatively connected to the optical output module, the image sensor, and the memory, wherein the processor may be configured to control the optical output module to output a spotlight at a first time point, control the optical output module to output a floodlight at a second time point, produce a first depth map based on first image data associated with a first reflected light that originates from the spotlight, produce a second depth map based on second image data associated with a second reflected light that originates from the floodlight, and produce a third depth map based on the first depth map and the second depth map.

In accordance with another aspect of the disclosure, a method performed by an electronic device for improving far-field performance of a camera is provided. The method includes controlling, by a processor of the electronic device, an optical output module of the electronic device to output a spotlight at a first time point, controlling, by the processor, the optical output module to output a floodlight at a second time point, producing, by the processor, a first depth map based on first image data associated with a first reflected light of the spotlight, an operation of producing a second depth map based on second image data associated with a second reflected light that originates from the floodlight, and producing, by the processor, a third depth map based on the first depth map and the second depth map.

According to various embodiments, an electronic device may maintain an existing resolution and SNR performance for operation performed within a short distance by using an indirect ToF (I-ToF), and may also obtain image data having high reliability in a long-distance shooting.

According to various embodiments, an electronic device may produce a first depth map that provides image data having high reliability in association with an object, even including a long-distance object, may produce a second depth map that provides image data having high resolution in association with a short-distance object, and may produce a third depth map that provides an image having high resolution in association with a short distance and a long distance by utilizing the first depth map and the second depth map.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
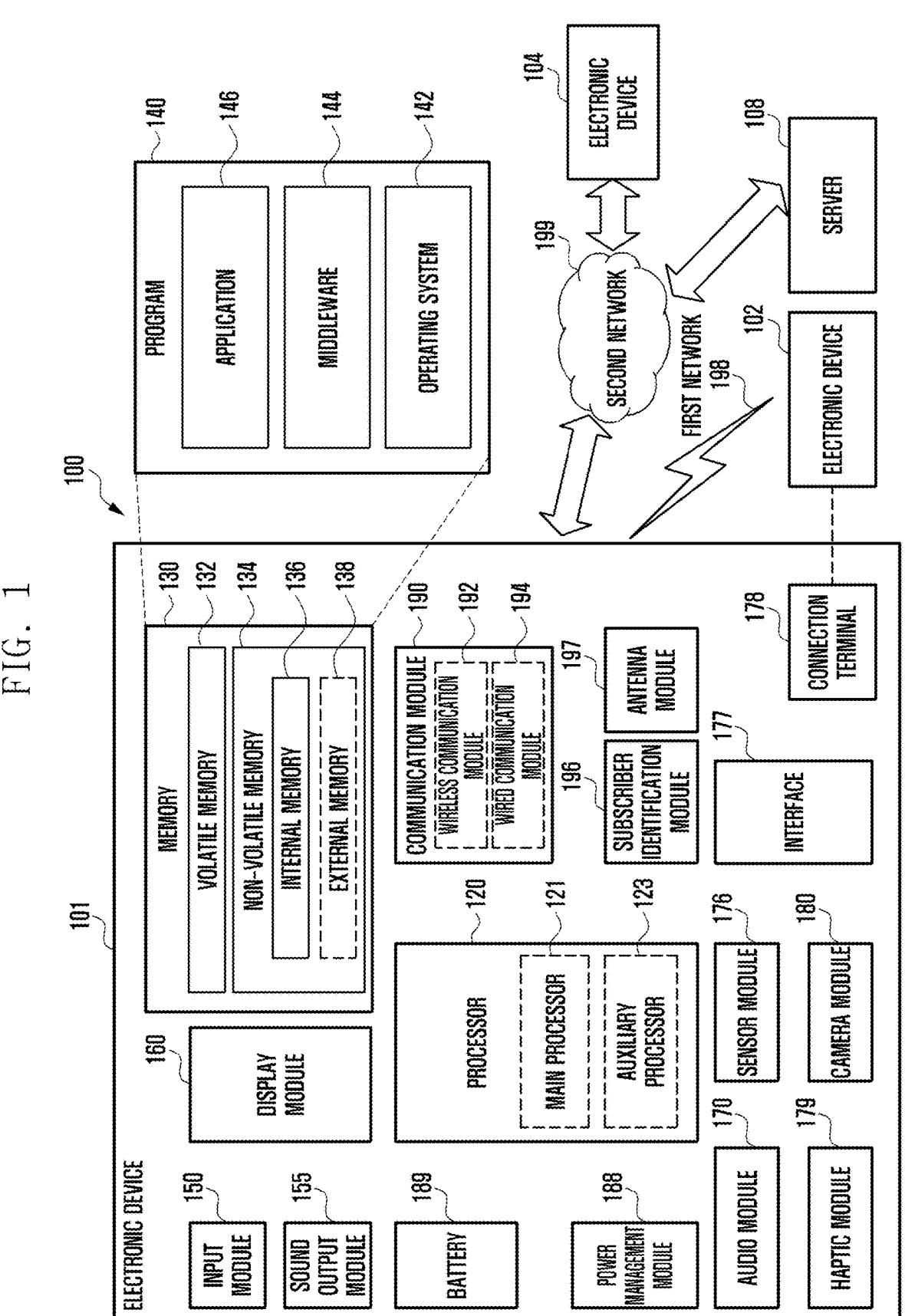
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server

108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
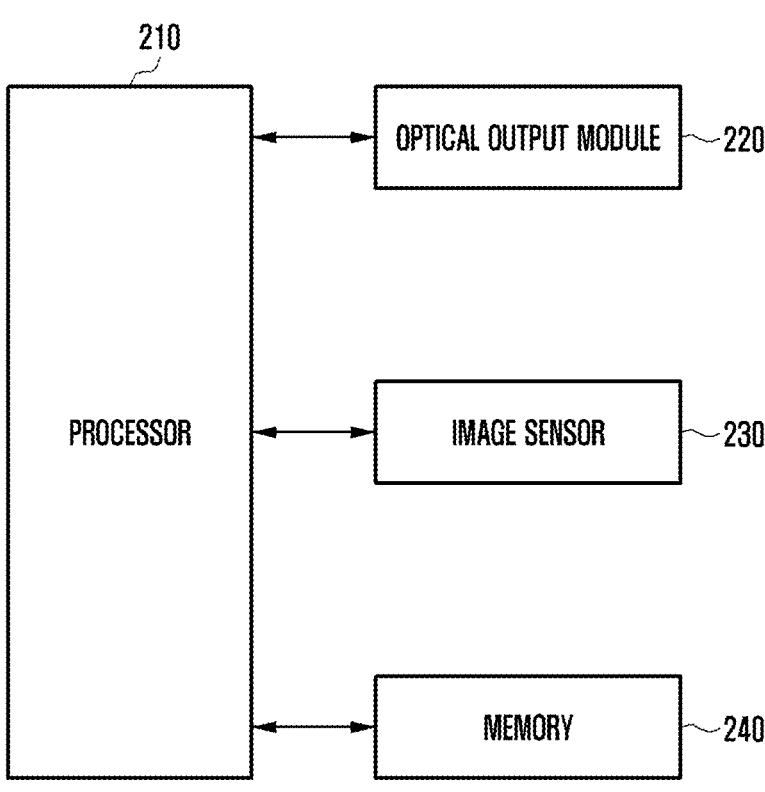
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include an optical output module 220, an image sensor 230, a processor 210, and a memory 240, and part of the illustrated configuration may be omitted or replaced in various embodiments. The electronic device 200 may further include at least part of the configuration and/or functions of the electronic device 101 of FIG. 1. At least part of the illustrated (or not illustrated) configuration of the electronic device 200 may be operatively, functionally, and/or electrically connected to each other.

According to various embodiments, the optical output module 220 may include a light-emitting diode (LED) that may output light in a visible light band (e.g., green, red, and the like) and/or may output light in an infra-red light band. For example, the optical output module 220 may be a surface-emitting laser (vertical-cavity surface-emitting laser (VCSEL)). A light emitting element may output a green light in a wavelength range of 520 nm to 565 nm, a red light having a wavelength of 660 nm, and/or an infra-red (IR) light in a wavelength range of 880 nm to 940 nm. The optical output module 220 may include light emitting diodes, and may output light based on an applied voltage.

According to various embodiments, the optical output module 220 may be embodied as a single-path structure including a single light emitting element, or may be embodied as a separate-path structure including two light emitting elements. In the single-path structure, the optical output module 220 may be embodied to output a spotlight via a single light emitting element, and switching between a spotlight and a floodlight may be embodied in a lens part. According to an embodiment, the lens part may be a liquid crystal (LC) lens or a voice coil motor (VCM) lens. In the separate-path structure, the optical output module 220 may include a first light emitting element that outputs a spotlight and a second light emitting element that outputs a floodlight. The optical output module 220 may output light via the first light emitting element and the second light emitting element in response to a control signal from the processor 210. According to an embodiment, the first light emitting element and the second light emitting element may be VCSEL chips.

According to various embodiments, in the optical output module 220, the first light emitting element that outputs a spotlight may be a VCSEL chip specific to outputting of a spotlight, and the second light emitting element that outputs a floodlight may be a VCSEL chip specific to outputting of a floodlight.

According to various embodiments, the optical output module 220 may further include a collimation lens. According to an embodiment, in case that light output from a light emitting element passes through the collimation lens, a progress path may be changed such that the light proceeds to the outside substantially parallel.

According to various embodiments, the optical output module 220 may further include a spot generator. The parallel light that is output from the light emitting element and passes through the collimation lens may pass through the spot generator and may scattered into multiple spotlights. For example, when outputting a spotlight, the optical output module 220 may output multiple spotlights that proceeds substantially parallel.

According to various embodiments, the image sensor 230 may include a complementary metal-oxide-semiconductor (CMOS) sensor and a charge-coupled device (CCD) sensor. The CMOS sensor may sense, by using a light reception device (e.g., a photodiode), reflected light that corresponds to light that is output from a light emitting element (e.g., an LED) and is reflected by an external object, and may measure, based on the reflected light sensed by the light receiving element, the distance from the electronic device 200 to a neighboring object. For example, depth data may be obtained.

According to various embodiments, the memory 240 may include volatile memory (e.g., the volatile memory 132 of FIG. 1) and non-volatile memory (e.g., the non-volatile memory 134 of FIG. 1), and may store various data temporarily or permanently. The memory 240 may include at least part of the configuration and/or functions of the memory 130 of FIG. 1, and may store the program 140 of FIG. 1.

According to various embodiments, the memory 240 may store various instructions executable in the processor 210. Such the instructions may include control commands, such as an arithmetic and logic operation, data transfer, input and output, and the like, which may be recognized by the processor 210.

According to various embodiments, the processor 210 may be a configuration that is operatively, functionally, and/or electrically connected to component elements (e.g., the optical output module 220, the image sensor 230, the processor 210, and the memory 240) of the electronic device 200, and is capable of performing an operation or data processing in association with control and/or communication of the component elements. The processor 210 may include at least part of the configuration and/or functions of the processor 120 of FIG. 1.

According to various embodiments, an operation and a data processing function that the processor 210 is capable of implementing in the electronic device 200 may not be limited. However, hereinafter, various embodiments for improving a far-field performance of a camera while maintaining a short-distance resolution will be described. Operations of the processor 210 to be described below may be performed by loading instructions stored in the memory 240.

According to various embodiments, the processor 210 may control the optical output module 220 so as to output light. According to an embodiment, in case that the optical output module 220 is provided in a single-path structure, the processor 210 may control a spotlight and a floodlight switching performed by the lens part. For example, the processor 210 may change a refractive index by changing a driving voltage of an LC lens, and may change a focal distance by driving a VCM. According to another embodiment, in case that the optical output module 220 is in a separate-path structure, the processor 210 may determine which of the first light emitting element and the second light emitting element is to be used for outputting light. The processor 210 may control the first light emitting element at a first time point so as to output a spotlight, and may control the second light emitting element at a second time point so as to output a floodlight.

According to various embodiments, the processor 210 may alternatively output a spotlight and a floodlight by performing time division. According to an embodiment, the processor 210 may control the optical output module 220 at a first time point so as to output a spotlight, and may control the optical output module 220 at a second time point so as to output a floodlight. According to an embodiment, the processor 210 may perform control so as to output a spotlight and a floodlight alternatively for each frame, and thus may alternatively obtain information associated with the reflected light of a spotlight and a floodlight for each frame. For example, light may be output by changing the refractive index of a lens for each frame or driving a VCM motor in the single-path structure, and light may be output by switching the first light emitting element and the second light emitting element at high speed in the separate-path structure. The processor 210 may output a spotlight using a DOE at a first time point, and may output a floodlight using an MLA at a second time point.

According to various embodiments, the processor 210 may produce image data using reflected light that the image sensor 230 receives. Specifically, the processor 210 may produce first image data by using the reflected light of a spotlight output at a first time point, and may produce second image data by using the reflected light of a floodlight output at a second time point. The first image data and the second image data may include information associated with each pixel. According to an embodiment, the image data may be a numerical value (e.g., a gray level) expressing the brightness of a subject.

According to various embodiments, the processor 210 may produce a depth map based on produced image data. The depth map may include at least one pixel, and each pixel may visually express information (e.g., color, shade) associated with the distance between a camera and an object. According to an embodiment, the depth map may be provided in a form that expresses the shape of an object in three dimensions (3-dimension) based on the distance between the camera and the object. The processor 210 may produce a first depth map by using the reflected light of a spotlight output at a first time point, and may produce a second depth map by using the reflected light of a floodlight output at a second time point. For example, the processor 210 may produce two different depth maps with respect to the same scene.

According to various embodiments, the processor 210 may recognize at least one spot point in first image data. The first image data may include at least one spot point, and a single spot point may include at least one pixel. A pixel may belong to a spot point or may not belong to a spot point. For example, a first pixel and a second pixel may belong to a first spot point, a third pixel may belong to a second spot point, and a fourth pixel may not belong to any spot point. The number of pixels (e.g., 300,000) that belong to image data may be significantly greater than the number of spot points (e.g., 4500).

According to various embodiments, based on image data, the processor 210 may perform depth calculation by calculating the distance from the electronic device 200 to an object. According to an embodiment, the processor 210 may output light in various phases, and may calculate, based on a difference in the received intensities of light between respective reflected lights, the distance from the electronic device 200 to the object.

For example, the processor 210 may output first light having a first phase, second light having a second phase, third light having a third phase, and fourth light having a fourth phase, and at least one image sensor may receive the reflected light of output light for each phase, and may produce electric charge. The processor 210 may identify the ratio of electric charge produced in first image data, second image data, third image data, and fourth image data, and may calculate how far an object is distant away from the electronic device 200.

According to various embodiments, the processor 210 may obtain a reliability value for each pixel of a second depth map. The reliability value may be determined based on the intensity of light received by each pixel. For example, in case that the intensity of light received by a first pixel is greater than the intensity of light received by a second pixel, a first reliability value of the first pixel may be a higher value than a second reliability value of the second pixel. According to an embodiment, the farther an object is distant away from the electronic device 200, the more difficult reflected light is received, and thus, the reliability value of a pixel may be low.

According to various embodiments, the processor 210 may perform noise filtering on image data. Specifically, based on the reliability value of a pixel, the processor 210 may determine a pixel having reliability greater than or equal to a reference value as a valid pixel, and may determine a pixel having reliability less than the reference value as an invalid pixel and may delete image data of the invalid pixel. According to an embodiment, the processor 210 may select only image data having high reliability via a noise filtering process, and may improve the accuracy of a depth map.

According to various embodiments, the processor 210 may produce a third depth map by using a first depth map and a second depth map. The operation distance of a spotlight may be longer than that of a floodlight, and thus, the first depth map may include image data associated with an object located in a relatively long distance, when compared to the second depth map. In addition, second image data produced based on a floodlight has higher resolution than first image data produced based on a spotlight, and thus a clearer image of an object located in a short distance may be obtained. According to an embodiment, the processor 210 may use the third depth map by using, for a long-distance object, the first image data which is produced based on the reflected light of a spotlight and using, for a short-distance object, the second image data which is produced based on the reflected light of a floodlight. According to an embodiment, the processor 210 may produce a long-distance dedicated depth map based on the first depth map and may produce a short-distance dedicated depth map based on the second depth map, separately according to a scenario.

According to various embodiments, the processor 210 may determine, a reliability value, each pixel of a second depth map as a valid pixel and an invalid pixel. According to an embodiment, the processor 210 may configure the reference value, may determine a pixel having a reliability value greater than or equal to the reference value as a valid pixel, and may determine a pixel having a reliability value less than the reference value as an invalid pixel. According to an embodiment, the processor 210 may configure a reference value such that the reference value is not lower than a value that decreases the resolution of image data and is higher than a value that enables filtering out incorrect data. The image data of an invalid pixel has low reliability, and thus may not reflect accurate information associated with the distance between the electronic device 200 and an object.

According to various embodiments, the processor 210 may produce a composite depth map by inputting image data of a second pixel located in a first location in a first depth map into image data of a first pixel located in a first location in a second depth map. According to an embodiment, the processor 210 may produce image data in units of spot points in the first depth map, and thus may input image data of a spot point including the first location in the first depth map. According to an embodiment, in case that a spot point is not formed in the first location of the first depth map, image data of a spot point closest to the first location may be input. The reliability of image data associated with a long-distance object is low in the second depth map, and thus the processor 210 may produce a composite depth map by combining an image of the second depth map associated with a short-distance object and an image of the first depth map associated with a long-distance object.

According to various embodiments, the processor 210 may produce a third depth map by interpolation of a composite depth map. According to an embodiment, the composite depth map may be obtained by combining the images of a first depth map and a second depth map, and thus there may be an unsmooth part. The processor 210 may produce the third depth map by performing an interpolation process on the composite depth map.

For example, the processor 210 may interpolate the image of the first depth map associated with a long-distance object. Although the reliability of each spot point in the first depth map may be high, resolution may be low, and thus the first depth map may be inappropriate for providing a smooth image. The processor 210 may obtain a smooth image by interpolating the image of the first depth map. According to an embodiment, the processor 210 may obtain a smooth image by interpolating the boundary between the image of the first depth map and the image of the second depth map.

Figure 3:
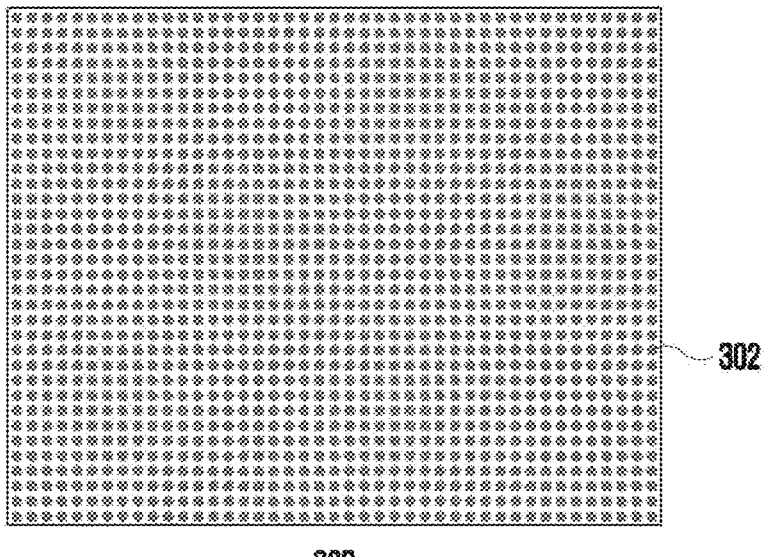
FIG. 3 is a diagram illustrating image data associated with reflected light of a spotlight and reflected light of a floodlight from an optical output module according to an embodiment of the disclosure.
Figure 3:
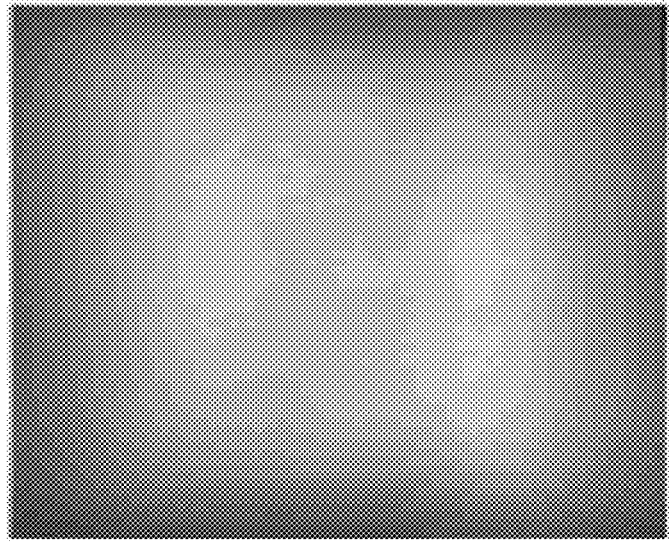

FIG. 3 is a diagram illustrating image data associated with reflected light of a spotlight and reflected light of a floodlight from an optical output module according to an embodiment of the disclosure.

Referring to FIG. 3, a spotlight 300 may include at least one spot point 302. In case that an optical output module (e.g., the optical output module 220 of FIG. 2) has a single-path structure, a processor (e.g., the processor 210 of FIG. 2) may control a lens part, and may determine light to output between the spotlight 300 and a floodlight 310. For example, in case that the optical output module has a separate-path structure, the processor may output the spotlight 300 and the floodlight 310 by controlling a first light emitting element that outputs the spotlight 300 and a second light emitting element that outputs the floodlight 310 in a time-division (time-sequential) manner. In case that the optical output module has a common-path structure, the processor may output the spotlight 300 or the floodlight 310 by controlling a lens part (e.g., an LC lens, VCM lens). Therefore, the processor may output the spotlight 300 or the floodlight 310 or may alternately output the spotlight 300 and the floodlight 310 by controlling the optical output module. For example, the processor may alternately output the spotlight 300 and the floodlight 310 for each frame.

According to various embodiments, the processor may produce first image data by using reflected light of the spotlight 300 and may produce second image data by using reflected light of the floodlight 310. The first image data and the second image data may include at least one pixel, and may include information associated with the brightness of light reflected from a subject. The processor may identify the first image data and the second image data, and may visually express the brightness (e.g., color, shade) of the subject in each pixel. For example, based on the intensity of light received by each pixel, the gray level of each pixel may be determined and, based thereon, different colors may be expressed. The first image data and the second image data may provide different information with respect to the same scene. For example, the first image data may provide more accurate information associated with an object located in a long distance, and the second image may provide more accurate information associated with an object located in a short distance.

According to various embodiments, the processor may produce a first depth map by using the first image data based on the reflected light of the spotlight 300 and may produce a second depth map by using the second image data based on the reflected light of the floodlight 310. Although the spotlight 300 may have resolution lower than that of the floodlight 310, the accuracy of data is high and an operation distance is long, and thus the spotlight 300 may be useful for obtaining information associated with a long-distance object. Although the floodlight 310 may have a shorter operation distance than that of the spotlight 300, resolution is significantly high, and thus the floodlight 310 may be useful for obtaining information associated with a short-distance object. The processor may obtain information associated with a long-distance object with reference to the first depth map, and may obtain information associated with a short-distance object with reference to the second depth map.

According to various embodiments, a composite depth map may be produced by combining the first depth map and the second depth map. According to an embodiment, the processor may produce the composite depth map by using an image of a long-distance object in the first depth map and an image of a short-distance object in the second depth map.

According to various embodiments, the processor may produce a third depth map by interpolating the composite depth map. According to an embodiment, the processor may produce a smooth image by interpolating the image of the first depth map associated with a long-distance object in the composite depth map.

Figure 4:
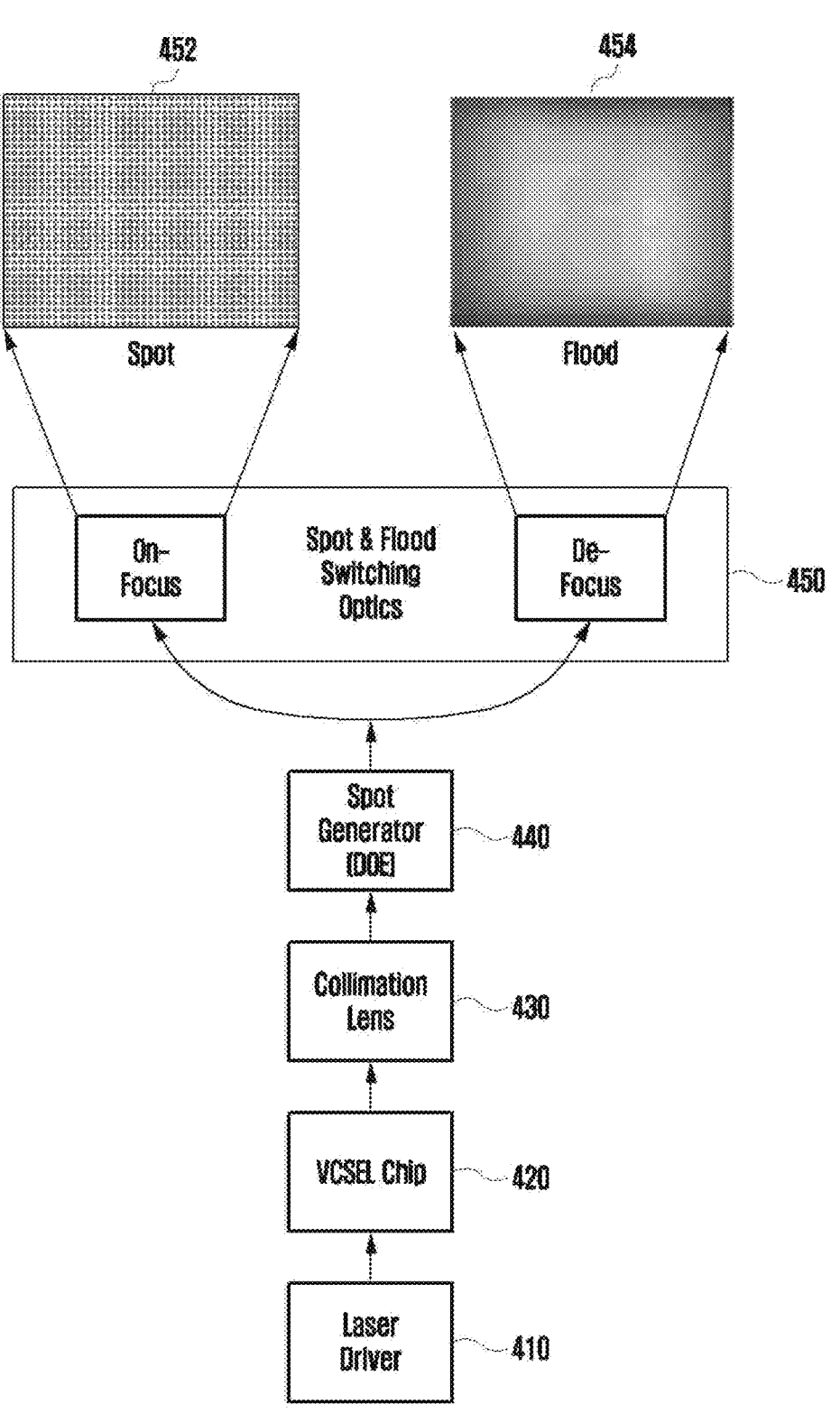
FIG. 4 is a diagram illustrating outputting of a spotlight and a floodlight by controlling a lens part according to an embodiment of the disclosure.

FIG. 4 is a diagram illustrating outputting of a spotlight and a floodlight by controlling a lens part according to an embodiment of the disclosure.

Referring to FIG. 4, an optical output module (e.g., the optical output module 220 of FIG. 2) may be provided in a single-path structure. In the optical output module in the single-path structure, an optics element that outputs a spotlight 452 and a floodlight 454 is not divided separately, and a processor (e.g., the processor 210 of FIG. 2) may control a lens part 450 so as to switch output of the spotlight 452 and output of the floodlight 454. Hereinafter, a mechanism in which the processor outputs the spotlight 452 and the floodlight 454 in the single-path structure will be described in detail.

According to various embodiments, the processor may supply a current to a laser driver 410. The laser driver 410 may be electrically connected to a light emitting element 420 (e.g., VCSEL chip, LTE). According to an embodiment, the laser driver 410 may receive a current supplied and may recognize the same as a trigger signal, and may transfer a pulse current to the light emitting element 420.

According to various embodiments, the light emitting element 420 that receives a current supplied may output light. The light emitting element 420 may convert an electric signal into an optical signal, and may output light in response to a pulse current received from the laser driver 410. Light output from the light emitting element 420 may be, for example, a vertical cavity surface emitting laser (VCSEL), a light emitting diode (LED), and an injection laser diode (ILD). According to an embodiment, the light emitting element 420 may output light in the vertical direction (or in the horizontal direction), and the output light may be scattered in a manner of being broadly spread. According to an embodiment, light output from the light emitting element 420 may pass through a collimation lens 430 and may proceed substantially parallel. According to an embodiment, the floodlight 454 may not need to produce a spot point, and thus may not need to pass through the collimation lens 430 and a spot generator 440. The processor may perform configuration so that light output from the light emitting element 420 passes through the collimation lens

430 and the spot generator 440 and progresses when the spotlight 452 is output at a first time point, and light output from the light emitting element 420 does not pass through the collimation lens 430 and the spot generator 440 when the floodlight 454 is output at a second time point.

According to various embodiments, a parallel light that passes through the collimation lens 430 may be input to the spot generator 440. The spot generator 440 may receive a single parallel light and may output multiple spotlights. The spot generator 440 may be a diffractive optical element (DOE). The processor may perform configuration so that, when the spotlight 452 is output at a first time point, the output light passes through the spot generator 440 and progresses, and when the floodlight 454 is output at a second time point, the output light does not pass through the spot generator 440.

According to various embodiments, light output from the light emitting element 420 may be output by passing through the lens part 450. According to an embodiment, the output light may be the spotlight 452 or the floodlight 454 based on the form of the lens part 450. The processor may control the lens part 450 so as to determine light to output among the spotlight 452 or the floodlight 454. For example, in case that the lens part 450 is an LC lens, the processor may adjust a voltage so as to control a refractive index of the lens part 450. In case that the processor adjusts a refractive index, so that the distance between the light emitting element 420 and a lens (the lens part 450) is identical to a focal distance, the spotlight 452 may be output. In case the distance is different from the focal distance, the floodlight 454 may be output. The processor may control the lens part 450 so that the spotlight 452 is output at a first time point and the floodlight 454 is output at a second time point. For example, the lens part 450 may be controlled (on-focus) so that the light emitting element 420 is located in the focal distance of a lens (the lens part 450) at a first time point, and the spotlight 452 may be output. The lens part 450 may be controlled (de-focus) so that the light emitting element 420 is not located in the focal distance of the lens (the lens part 450) at a second time point, and the floodlight 454 may be output.

Figure 5:
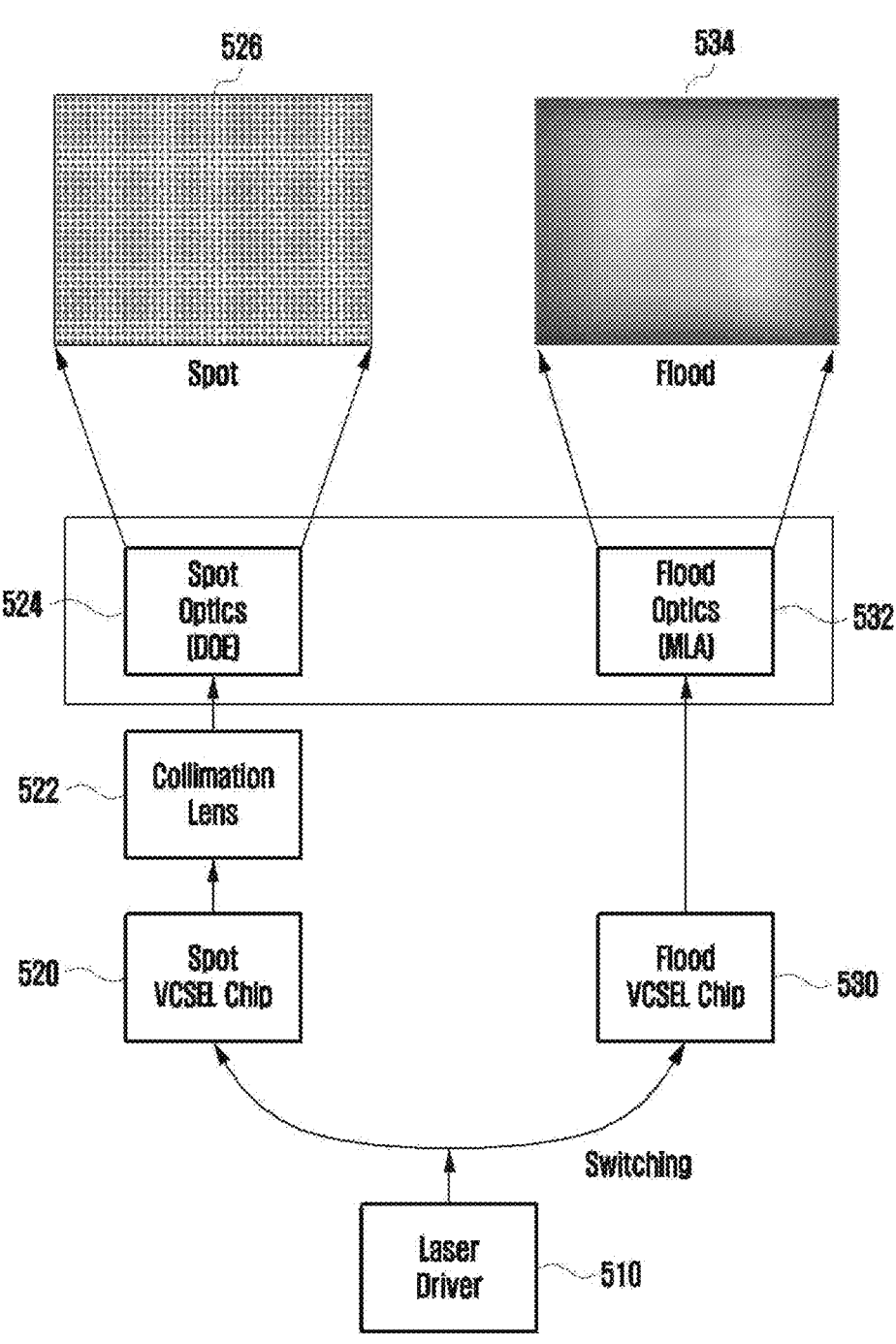
FIG. 5 is a diagram illustrating outputting a spotlight from a first light emitting element and outputting a floodlight from a second light emitting element according to an embodiment of the disclosure.

FIG. 5 is a diagram illustrating outputting a spotlight from a first light emitting element and outputting a floodlight from a second light emitting element according to an embodiment of the disclosure.

Referring to FIG. 5, an optical output module (e.g., the optical output module 220 of FIG. 2) may be provided in a single-path structure. An optical output module provided in a separate-path structure may include a first light emitting element 520 that outputs a spotlight 526 and a second light emitting element 530 that outputs a floodlight 534. A processor (e.g., the processor 210 of FIG. 2) may transmit a control signal to an optical output module and may perform control so that the first light emitting element 520 or the second light emitting element 530 outputs light. Hereinafter, a mechanism in which the processor outputs the spotlight 526 and the floodlight 534 in the separate-path structure will be described in detail. A description associated with operation of the configuration which has been described with reference to FIG. 4 will be omitted.

According to various embodiments, an optical output module may include a first light emitting element 520 that outputs the spotlight 526 and a second light emitting element 530 that outputs the floodlight 534. The first light emitting element 520 and the second light emitting element 530 may be VCSEL chips, the first light emitting element may be embodied as a VCSEL chip optimized to output the spotlight

526 and the second light emitting element may be embodied as a VCSEL chip optimized to output the floodlight 534.

According to various embodiments, the processor may determine a light emitting element to operate and output light between the first light emitting element 520 and the second light emitting element 530. According to an embodiment, the processor may operate the first light emitting element 520 and output the spotlight 526 at a first time point, and may operate the second light emitting element 530 and output the floodlight 534 at a second time point. According to an embodiment, the processor may determine whether to output the spotlight 526 or the floodlight 534 when supplying a current to the laser driver 510, and may perform switching.

According to various embodiments, in case that the spotlight 526 is output at a first time point, the processor may supply a current to the first light emitting element 520 (e.g., a spot VCSEL chip) that outputs the spotlight 526. The first light emitting element 520 may be an optics element optimized to output the spotlight 526. According to various embodiments, the processor may provide guidance so that light output from the first light emitting element 520 passes through the collimation lens 522 and proceed to the lens part 524 (e.g., a diffractive optics element). Light output from the first light emitting element 520 may be spread while progressing, and may proceed parallel by passing through the collimation lens 522. According to an embodiment, a diffractive optics element may control progress of light via diffraction due to a periodic structure of a surface or the inside of the diffractive optics element.

According to various embodiments, in case that the floodlight 534 is output at a second time point, the processor may supply a current to the second light emitting element 530 (e.g., a flood VCSEL chip) that outputs the floodlight 534. The second light emitting element 530 may be an optical device optimized to output the floodlight 534. According to various embodiments, the floodlight 534 does not use parallel light, and thus the processor may provide guidance so that light output from the second light emitting element 530 proceeds toward a lens part without passing through the collimation lens 522. The light output from the second light emitting element 530 may pass through the lens part 532 (e.g., an MLA) and may be broadly spread while progressing.

According to various embodiments, the processor may output the spotlight 526 at a first time point and may output the floodlight 534 at a second time point, and may switch the first time point and the second time point at high speed. For example, the processor may control an optical output module so that the spotlight 526 is output in a first frame and the floodlight 534 is output in a second frame that is a consecutive frame of the first frame.

FIGS. 6A, 6B, 6C, and 6D are diagrams of a first depth map, a second-depth map, a composite depth map, and a third depth map according to various embodiments of the disclosure.

Figure 6A:
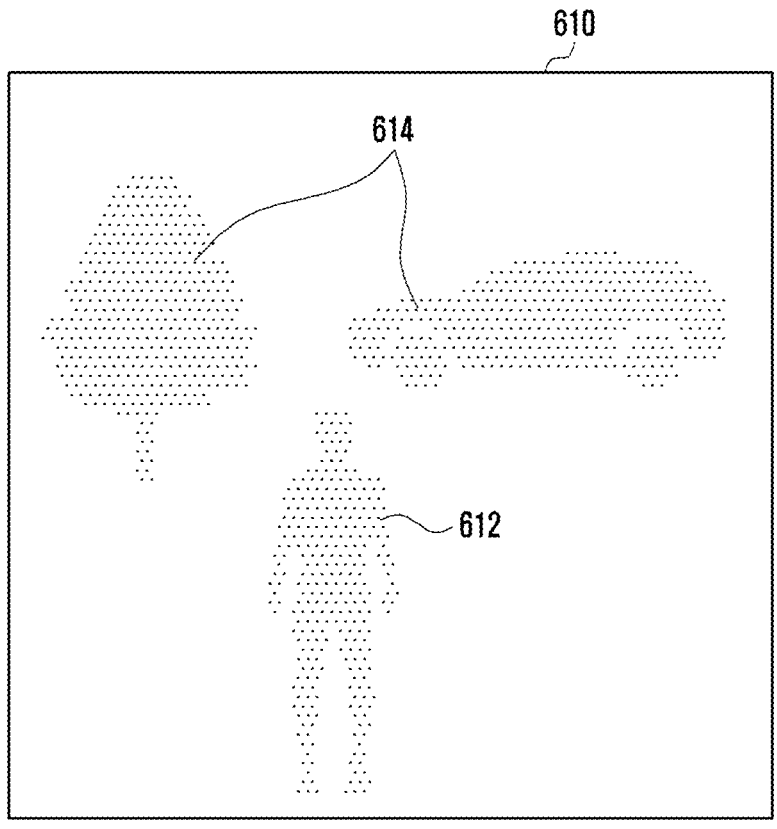
FIGS. 6A, 6B, 6C, and 6D are diagrams of a first depth map, a second depth map, a composite depth map, and a third depth map according to various embodiments of the disclosure.

Referring to FIG. 6A, a processor (e.g., the processor 210 of FIG. 1) may produce a first depth map 610 using a spotlight. The processor may obtain depth information associated with a long-distance object and a short-distance object by using a spotlight. For example, by using slot light, the processor may produce a first depth map including a first image 612 associated with a first object located in a short distance and a second image 614 associated with a second object located in a long distance. According to an embodiment, the spotlight proceeds parallel, and thus the reliabilities of image data of both the first images 612 and the second image 614 may be greater than or equal to a reference value.

Figure 6B:
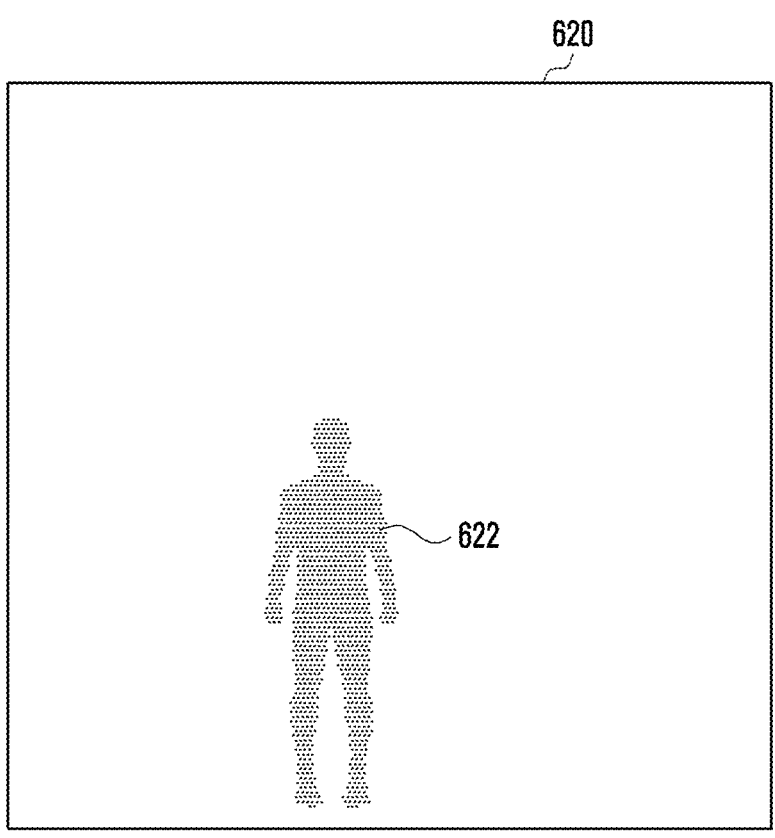

Referring to FIG. 6B, the processor may produce a second depth map 620 using a floodlight. The processor may obtain image data having high resolution of a short-distance object by using a floodlight. For example, the processor may produce a second depth map including a third image 622 associated with the first object located in a short distance by using a floodlight. According to an embodiment, the floodlight may be spread while progressing, and thus only image data associated with an object located in a short distance may be obtained and image data associated with an object located in a long distance may not be obtained. For example, the second depth map may not display the second object.

Figure 6C:
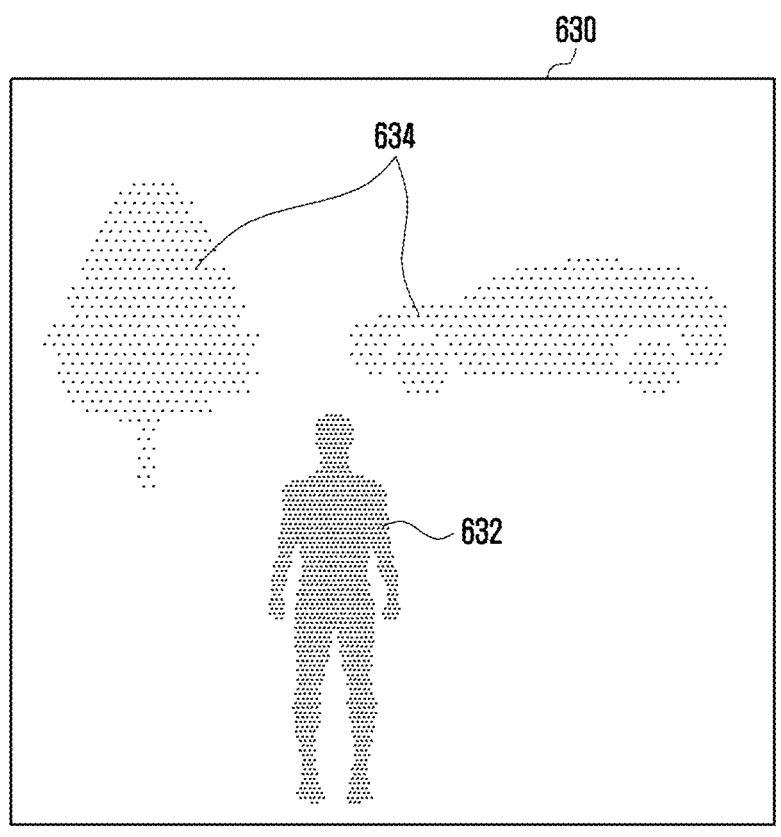

Referring to FIG. 6C, the processor may produce a composite depth map 630 by combining the first depth map 610 and the second depth map 620. According to an embodiment, when producing the composite depth map 630, the processor may use an image of the second depth map 620 associated with the short-distance object and an image of the first depth map 610 associated with the long-distance object. For example, the processor may produce the composite depth map 630 by selecting the third image 622 for a fourth image 632 associated with the first object located in the short distance and selecting the second image 614 for a fifth image 634 associated with the second object located in the long distance. In association with the first object, the third image 622 may provide information having higher density than the first image 612. In association with the second object, the second image 614 may provide information.

Figure 6D:
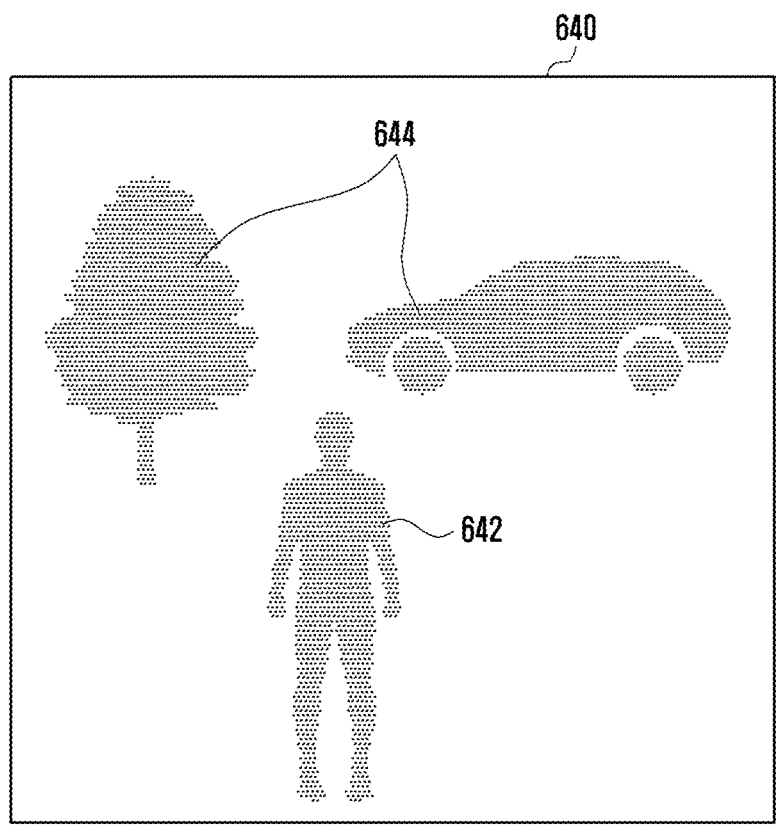

Referring to FIG. 6D, the processor may produce a third depth map 640 by interpolating the composite depth map 630. According to an embodiment, the processor may produce smooth image data by interpolating an unsmooth part in the composite depth map 630. For example, although a sixth image 642 associated with the first object in the third depth map 640 may be similar to the fourth image 632 associated with the first object in the composite depth map 630, a seventh image 644 associated with the second object in the third depth map 640 may be an image obtained by interpolating a fifth image 634 associated with the second object of the composite depth map 630 to be smooth. According to various embodiments, the processor may perform interpolation by using image data having high resolution for a short-distance object and using image data having high accuracy for a long-distance object, thereby producing the third depth map 640 having generally high resolution.

An electronic device according to various embodiments may include an optical output module, an image sensor configured to receive reflected light that originates from light output by the optical output module, and to obtain image data, a memory, and a processor operatively connected to the optical output module, the image sensor, and the memory, wherein the processor is configured to control the optical output module to output a spotlight at a first time point, control the optical output module to output a floodlight at a second time point, produce a first depth map based on first image data associated with a first reflected light that originates from the spotlight, produce a second depth map based on second image data associated with a second reflected light that originates from the floodlight, and produce a third depth map based on the first depth map and the second depth map.

According to various embodiments, the processor may be further configured to alternately switch the first time point at which the optical output module outputs the spotlight and the second time point at which the optical output module outputs the floodlight.

According to various embodiments, the optical output module may further include a lens part, and the processor may be further configured to control the lens part to output the spotlight at the first time point and to output the floodlight at the second time point.

According to various embodiments, the lens part may be a liquid crystal lens or a voice coil motor (VCM) lens.

According to various embodiments, the optical output module may further include a first light emitting element that outputs the spotlight and a second light emitting element that outputs the floodlight, and the processor may be further configured to control the first light emitting element to output the spotlight at the first time point, and control the second light emitting element to output the floodlight at the second time point.

According to various embodiments, the first light emitting element may include a diffractive optics element via which the spotlight is output, and the second light emitting element may include a micro lens array via which the floodlight is output.

According to various embodiments, the processor may be further configured to produce the first depth map by performing noise filtering on the first image data, and to produce the second depth map by performing the noise filtering on the second image data.

According to various embodiments, the processor may be further configured to identify at least one spot point based on the intensity of a portion of the first reflected light that is respectively received by each pixel in the first depth map, and to produce, based on image data of the identified at least one spot point, the first depth map.

According to various embodiments, the processor may be further configured to identify the intensity of a portion of the second reflected light that is respectively received by each pixel in the second depth map, obtain a reliability value of each pixel based on the identified intensity, determine, as a valid pixel, a pixel of which the obtained reliability value is greater than or equal to a reference value, and determine, as an invalid pixel, a pixel of which the obtained reliability value is less than the reference value.

According to various embodiments, the processor may be configured to identify a spot point closest to the invalid pixel in the first depth map, and produce the third depth map by inputting image data of the identified spot point to the image data of the invalid pixel.

Figure 7:
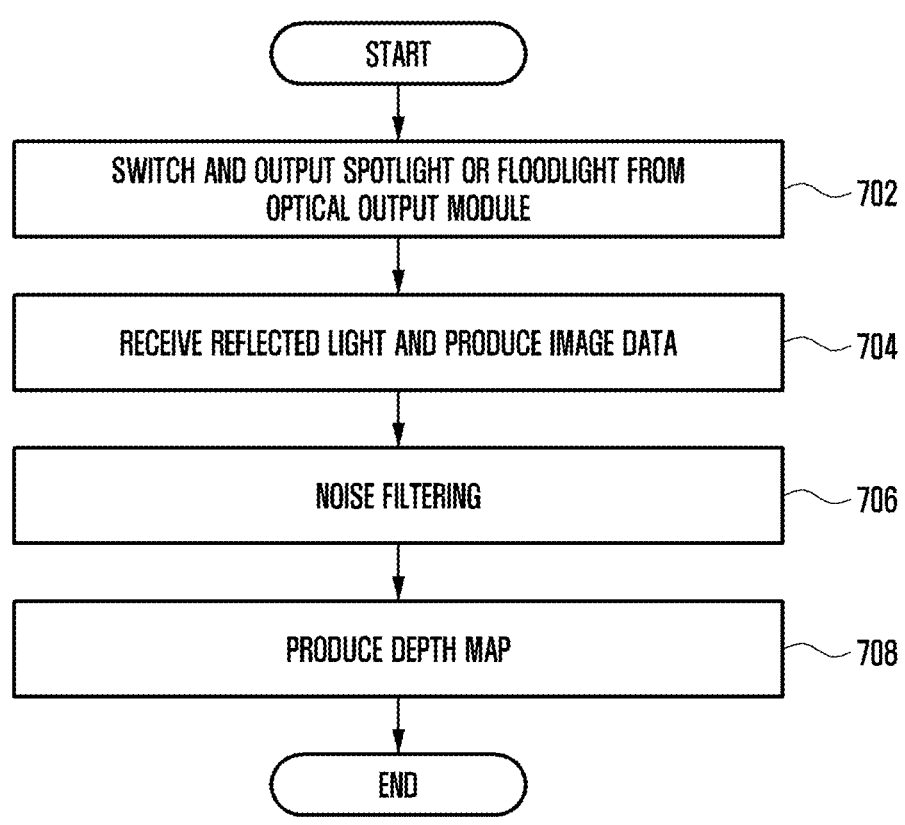
FIG. 7 is a flowchart illustrating a method of producing a depth map in an electronic device according to an embodiment of the disclosure.

FIG. 7 is a flowchart illustrating a method of producing a depth map by an electronic device according to an embodiment of the disclosure.

According to various embodiments, in operation 702, an electronic device may switch and output a spotlight or a floodlight via an optical output module. According to an embodiment, in case that the optical output module is provided in a single-path structure, the electronic device may control a lens part to perform switching between a spotlight and a floodlight. For example, the electronic device may change a refractive index by changing a driving voltage of an LC lens, and may change a focal distance by driving a VCM. According to another embodiment, in case that the optical output module is provided in a separate-path structure, the electronic device may determine a light emitting element to output light between a first light emitting element and a second light emitting element. The electronic device may control the first light emitting element at a first time point so as to output a spotlight, and may control the second light emitting element at a second time point so as to output a floodlight.

According to various embodiments, the electronic device may alternatively output a spotlight and a floodlight by performing time division. According to an embodiment, the electronic device may control the optical output module at a first time point so as to output a spotlight, and may control the optical output module at a second time point so as to output a floodlight. According to an embodiment, the electronic device may perform control so as to output a spotlight and a floodlight alternatively for each frame, and thus may alternatively obtain information associated with the reflected light of a spotlight and a floodlight for each frame.

According to various embodiments, the optical output module may be provided in a single-path structure. In the optical output module provided in the single-path structure, an optics element that outputs a spotlight and a floodlight is not separately divided, and the electronic device may control a lens part so as to switch output of a spotlight and a floodlight.

According to various embodiments, the electronic device may supply a current to a laser driver. The laser driver may be electrically connected to a light emitting element (e.g., VCSEL chip, long term evolution (LTE)). According to an embodiment, the laser driver may receive a current supplied and may recognize the same as a trigger signal, and may transfer a pulse current to the light emitting element.

According to various embodiments, a light emitting element that receives a current supplied may output light. A light emitting element may convert an electric signal into an optical signal, and may output light in response to the pulse current received from the laser driver. Light output from a light emitting element may be, for example, a vertical cavity surface emitting laser (VCSEL), a light emitting diode (LED), and an injection laser diode (ILD). According to an embodiment, a light emitting element may output light in the vertical direction (or in the horizontal direction), and the output light may be scattered in a manner of being broadly spread. According to an embodiment, light output from a light emitting element may pass through a collimation lens (e.g., the collimation lens 430 of FIG. 4) and may proceed substantially parallel. According to an embodiment, a floodlight may not need to produce a spot point and thus, may not pass through a collimation lens and a spot generator. The electronic device may perform configuration so that light output from a light emitting element proceeds by passing through the collimation lens and the spot generator when a spotlight is output at the first time point, and light output from a light emitting element does not pass through the collimation lens and the spot generator when a floodlight is output at the second time point.

According to various embodiments, parallel light that passes through the collimation lens may be input to the spot generator. The spot generator may receive a single parallel light and output multiple spotlights. The spot generator may be a diffractive optical element (DOE). The electronic device may perform configuration so that an output light proceeds by passing through the spot generator when a spotlight is output at the first time point, and may an output light does not pass through the spot generator when a floodlight is output at the second time point.

According to various embodiments, light output from a light emitting element may be output by passing through a lens part. According to an embodiment, the output light may be a spotlight or a floodlight according to the type of lens part. The electronic device may control the lens part to determine which of a spotlight or a floodlight is to be output. For example, in case that the lens part is an LC lens, the electronic device may adjust a voltage and may control a refractive index of the lens part. In case that the electronic device has a value identical to a focal distance by adjusting the refractive index, a spotlight may be output. In case that the electronic device has a value different from the focal distance, a floodlight may be output. The electronic device may control the lens part so that a spotlight is output at a first time point and a floodlight is output at a second time point. For example, the electronic device may control (on-focus) the lens part so that an object is located in the focal distance of a camera and may output a spotlight at the first time point, and may control (de-focus) the lens part so that an object is not located in the focal distance of the camera and may output a floodlight at the second time point.

According to various embodiments, the optical output module may be provided in a separate-path structure. The optical output module in the separate-path structure may include a first light emitting element that outputs a spotlight and a second light emitting element that outputs a floodlight. The electronic device may transmit a control signal to the optical output module, and may perform control so that the first light emitting element or the second light emitting element outputs light.

According to various embodiments, the optical output module may include the first light emitting element that outputs a spotlight and the second light emitting element that outputs a floodlight. The first light emitting element and the second light emitting element may be VCSEL chips, the first light emitting element may be embodied as a VCSEL chip optimized to output a spotlight, and the second light emitting element may be embodied as a VCSEL chip optimized to output a floodlight.

According to various embodiments, the electronic device may determine a light emitting element to operate and output light between the first light emitting element and the second light emitting element. According to an embodiment, the electronic device may operate the first light emitting element at a first time point so as to output a spotlight, and may operate the second light emitting element at a second time point so as to output a floodlight. According to an embodiment, when supplying a current to a laser driver, the electronic device may determine whether to output a spotlight or a floodlight, and may perform switching.

According to various embodiments, in case that a spotlight is output at the first time point, the electronic device may supply a current to the first light emitting element (e.g., a spot VCSEL chip) that outputs a spotlight. The first light emitting element may be an optics element optimized to output a spotlight. According to various embodiments, the electronic device may provide guidance so that light output from the first light emitting element proceeds toward a lens part (e.g., diffractive optics element) by passing through a collimation lens. Light output from the first light emitting element may be spread while progressing, and may proceed parallel by passing through the collimation lens. According to an embodiment, the diffractive optics element may control progress of light via diffraction due to a periodic structure of a surface or the inside of the diffractive optics element.

According to various embodiments, in case that a floodlight is output at the second time point, the electronic device may supply a current to the second light emitting element (e.g., a flood VCSEL chip) that outputs a floodlight. The second light emitting element may be an optics element optimized to output a floodlight. According to various embodiments, a floodlight does not use parallel light, and thus the electronic device may provide guidance so that light output from the second light emitting element proceeds toward the lens part without passing through the collimation lens. The light output from the second light emitting element may pass through the lens part (e.g., an MLA) and may be broadly spread while progressing.

According to various embodiments, the electronic device may output a spotlight at the first time point and may output a floodlight at the second time point, and may switch the first time point and the second time point at high speed. For example, the electronic device may control an optical output module so that a spotlight is output in a first frame and a floodlight is output in a second frame that is a consecutive frame of the first frame.

According to various embodiments, in operation 704, the electronic device may produce image data using received reflected light. According to an embodiment, the electronic device may produce first image data by using reflected light of a spotlight output at the first time point, and may produce second image data by using reflected light of a floodlight output at the second time point. The first image data and the second image data may include information associated with each pixel. According to an embodiment, the image data may be a numerical value (e.g., a gray level) expressing the brightness of a subject.

According to various embodiments, in operation 706, the electronic device may perform noise filtering on the produced image data. According to an embodiment, the electronic device may identify the intensity of reflected light received by each pixel of the image data, and may determine a reliability value corresponding thereto. In case that the reliability of a pixel is greater than or equal to a reference value, the electronic device may determine the pixel as a valid pixel. In case that the reliability of a pixel is less than the reference value, the pixel may be determined as an invalid pixel. According to an embodiment, the electronic device may remove image data of an invalid pixel and may proceed with noise filtering.

According to various embodiments, based on the image data, the electronic device may perform depth calculation by calculating the distance from the electronic device to an object. According to an embodiment, the electronic device may output light in various phases, and may calculate, based on a difference in the received intensities of light between respective reflected lights, the distance from the electronic device to the object.

According to various embodiments, in operation 708, the electronic device may produce a depth map using noise-filtered image data. According to an embodiment, a depth map may include at least one pixel, and each pixel may visually express information (e.g., color, shade) associated with the distance between the camera and the object According to an embodiment, the depth map may be provided in a form that expresses the shape of an object in three dimensions (3-dimension) based on the distance between the camera and the object. The electronic device may produce a first depth map by using reflected light of a spotlight output at the first time point, and may produce a second depth map by using reflected light of a floodlight output at the second time point. That is, the electronic device may produce two different depth maps with respect to the same scene.

According to various embodiments, a composite depth map may be produced by combining the first depth map and the second depth map. According to an embodiment, the electronic device may produce the composite depth map by using an image of a long-distance object in the first depth map and an image of a short-distance object in the second depth map.

Figure 8:
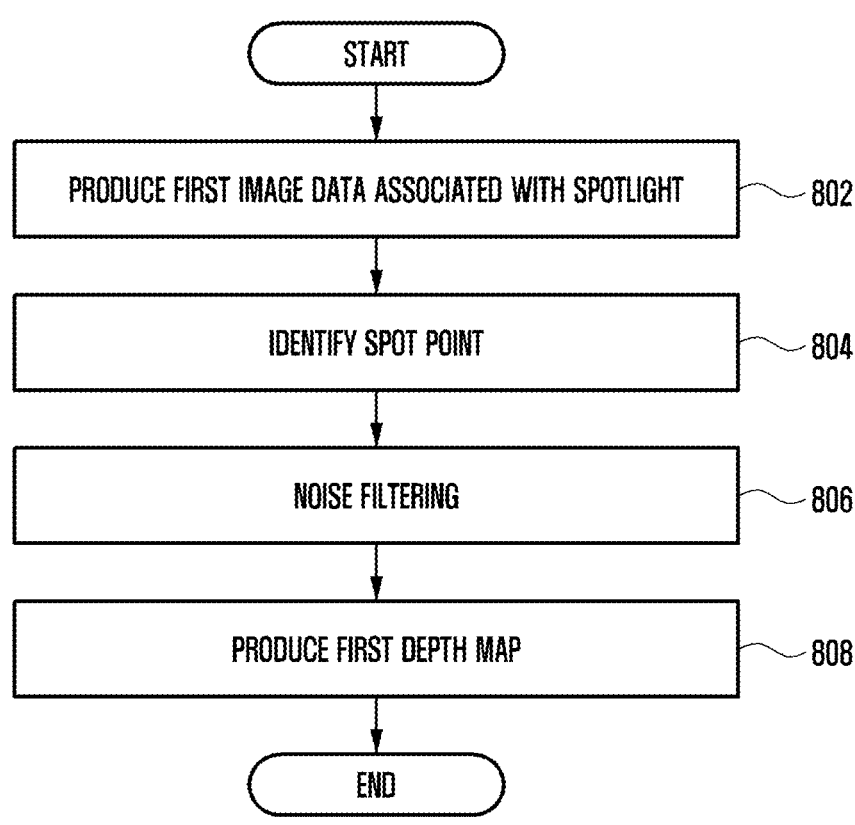
FIG. 8 is a flowchart illustrating a method of producing a first depth map according to an embodiment of the disclosure.

FIG. 8 is a flowchart illustrating a method of producing a first depth map according to an embodiment of the disclosure.

According to various embodiments, in operation 802, the electronic device may produce first image data associated with a spotlight. The electronic device may output a spotlight by controlling an optical output module, and may identify information associated with reflected light received by an image sensor (e.g., the image sensor 230 of FIG. 2). The electronic device may produce first image data based on the reflected light. The first image data may provide depth information having high reliability in association with a long-distance object.

According to various embodiments, in operation 804, the electronic device may identify a spot point. The first image data may include at least one spot point, and a single spot point may include at least one pixel. A pixel may belong to a spot point or may not belong to a spot point. The number of pixels (e.g., 300,000) that belong to the image data may be significantly greater than the number of spot points (e.g., 4500).

According to various embodiments, the electronic device may obtain a reliability value for each pixel of a second depth map. The reliability value may be determined based on the intensity of light received by each pixel. For example, in case that the intensity of light received by a first pixel is greater than the intensity of light received by a second pixel, a first reliability value of the first pixel may be higher value than the second reliability value of the second pixel. According to an embodiment, the farther an object is distant away from the electronic device, the more difficult reflected light is received, and thus the reliability value of a pixel may be low.

According to various embodiments, in operation 806, the electronic device may perform noise filtering on the first image data. Specifically, based on the reliability value of a pixel, the electronic device may determine a pixel having reliability greater than or equal to a reference value as a valid pixel, and may determine a pixel having reliability less than the reference value as an invalid pixel and may delete image data of the invalid pixel. According to an embodiment, the electronic device may select only image data having high reliability by proceeding with a noise filtering process.

According to various embodiments, in operation 808, the electronic device may produce a first depth map using first image data. The first depth map may be a map showing a distance between an electronic device and an object existing in a captured scene. The electronic device may express the distance to the object in the first depth map by using color and shade.

Figure 9:
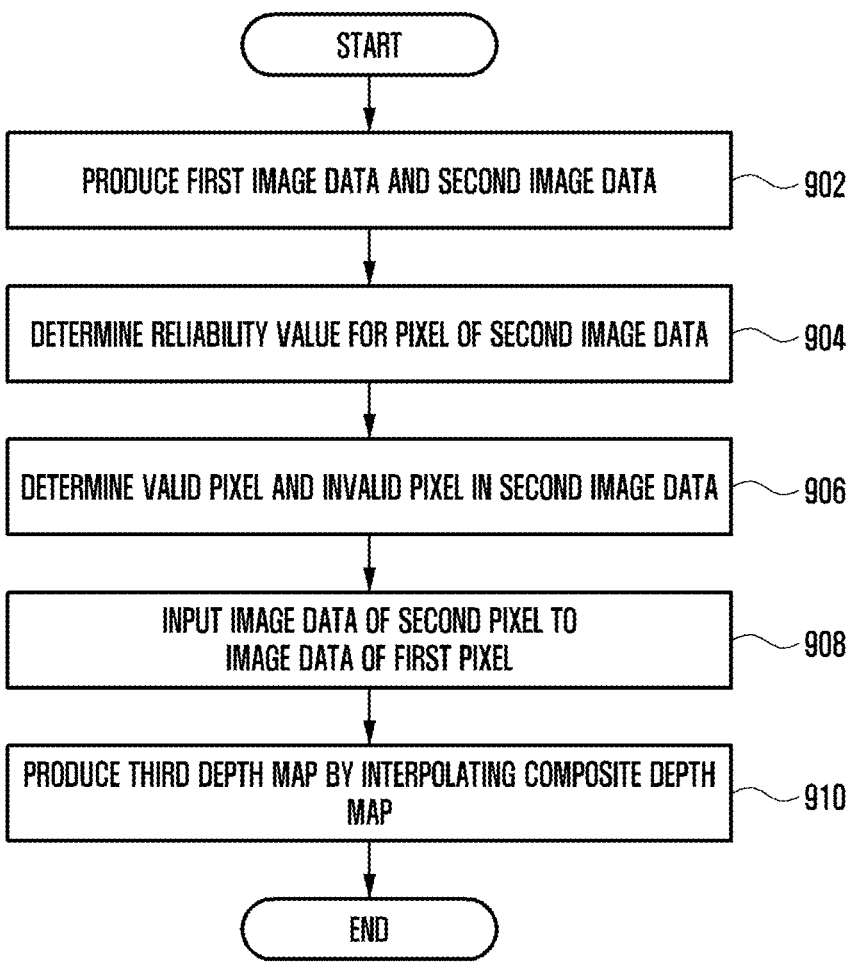
FIG. 9 is a flowchart illustrating a method of producing a third depth map by an electronic device according to an embodiment of the disclosure.

FIG. 9 is a flowchart illustrating a method of producing a third depth map by an electronic device according to an embodiment of the disclosure.

According to various embodiments, in operation 902, the electronic device may produce first image data by using reflected light of a spotlight, and may produce second image data by using reflected light of a floodlight. The first image data and the second image data may include at least one pixel, and may include information associated with the brightness of light reflected from a subject. The electronic device may identify the first image data and the second image data, and may visually express the brightness (e.g., color, shade) of the subject in each pixel. The first image data and the second image data may provide different information for the same scene.

According to various embodiments, in operation 904, the electronic device may determine a reliability value for each pixel of the second image data. According to an embodiment, the electronic device may identify the intensity of reflected light received by each pixel, and may determine a reliability value corresponding to the intensity of reflected light. For example, received reflected light that has a large amount of light is determined as light having a high reliability value, and received reflected light that has a low amount of light is determined as light having a low reliability value.

According to various embodiments, in operation 906, the electronic device may determine a valid pixel and an invalid pixel in the second image data. According to an embodiment, the electronic device may configure a reference value, may determine a pixel having a reliability value greater than or equal to the reference value as a valid pixel, and may determine a pixel having a reliability value less than the reference value as an invalid pixel. According to an embodiment, the electronic device may configure a reference value such that the reference value is not lower than a value that decreases the resolution of image data and is higher than a value that enables filtering out incorrect data. The image data of an invalid pixel has low reliability, and thus may not reflect accurate information associated with the distance between the electronic device and an object.

According to various embodiments, in operation 908, the electronic device may produce a composite depth map by inputting image data of a second pixel located in a first location in the first depth map into image data of a first pixel located in a first location in the second depth map. According to an embodiment, the electronic device may produce image data in units of spot points in the first depth map, and thus may input image data of a spot point including the first location in the first depth map. According to an embodiment, in case that a spot point is not formed in the first location of the first-depth map, image data of a spot point closest to the first location may be input. For example, the processor may input image data of a pixel located in the first location of the first depth map to an invalid pixel located in the first location of the second depth map. In case that a spot point including the first location is not present in the first depth map, the processor may identify the spot point closest to the first location, and may input image data of the identified spot point to an invalid pixel located in the first location. The reliability of image data associated with a long-distance object is low in the second depth map, and thus the electronic device may produce a composite depth map by combining image data of the second depth map associated with a short-distance object and image data of the first depth map associated with a long-distance object.

According to various embodiments, the operation distance of a spotlight may be longer than a floodlight, and thus the first depth map may include image data associated with an object located in a relatively long distance, when compared to the second depth map. In addition, a second image produced based on a floodlight may have higher resolution than a first image produced based on a spotlight, and thus a clearer image of an object located in a short distance may be obtained. According to an embodiment, the electronic device may use, for a long-distance object, an image produced based on reflected light of a spotlight, and may use, for a short-distance object, an image produced based on reflected light of a floodlight, so as to produce a composite depth map. According to an embodiment, the electronic device may separately produce a long-distance dedicated depth map based on the first depth map and a short-distance dedicated depth map based on the second depth map, according to a scenario.

According to various embodiments, in operation 910, the electronic device may produce a third depth map by interpolating the composite depth map. According to an embodiment, the composite depth map may be obtained by combining the images of the first depth map and the second depth map, and thus there may be an unsmooth part. The electronic device may produce the third depth map by performing an interpolation process on the composite depth map.

For example, the electronic device may interpolate the image of the first depth map associated with a long-distance object. Although the reliability of each spot point in the first depth map may be high, resolution may be low, and thus the first depth map may be inappropriate for providing a smooth image. The electronic device may obtain a smooth image by interpolating the image of the first depth map. According to an embodiment, the electronic device may obtain a smooth image by interpolating the boundary between the image of the first depth map and the image of the second depth map.

A method performed by an electronic device for improving far-field performance of a camera according to various embodiments may include controlling, by a processor of the electronic device, an optical output module of the electronic device to output a spotlight at a first time point, controlling, by the processor, the optical output module to output a floodlight at a second time point, producing a first depth map based on first image data associated with a first reflected light that originates from the spotlight, producing a second depth map based on second image data associated with a second reflected light that originates from the floodlight, and producing a third depth map based on the first depth map and the second depth map.

According to various embodiments, the method may further include alternatively switching the first time point at which the optical output module outputs the spotlight and the second time point at which the optical output module outputs the floodlight.

According to various embodiments, the optical output module may further include a lens part, and the switching between the first time point and the second time point may include controlling the lens part so as to output the spotlight at the first time point and to output the floodlight at the second time point.

According to various embodiments, the lens part may be a liquid crystal lens or a voice coil motor (VCM) lens.

According to various embodiments, the optical output module may include a first light emitting element that outputs the spotlight and a second light emitting element that outputs the floodlight, and the switching between the first time point and the second time point may include controlling a first light emitting element to output the spotlight at the first time point, and controlling a second light emitting element to output the floodlight at the second time point.

According to various embodiments, the spotlight output from the first light emitting element may be output via a diffractive optics element, and the floodlight output from the second light emitting element may be output via a micro lens array.

According to various embodiments, the method may further include producing the first depth map by performing noise filtering on the first image data, and producing the second depth map by performing the noise filtering on the second image data.

According to various embodiments, the producing of the first depth map may include identifying at least one spot point based on the intensity of a portion of the first reflected light that is respectively received by each pixel in the first depth map, and producing, based on image data of the identified at least one spot point, the first depth map.

According to various embodiments, the producing of the second depth map may further include identifying an intensity of a portion of the second reflected light that is respectively received by each pixel in the second depth map, obtaining a reliability value of each pixel based on the identified intensity, determining, as a valid pixel, a pixel of which the obtained reliability value is greater than or equal to a reference value, and an operation of determining, as an invalid pixel, a pixel of which the obtained reliability value is less than the reference value.

According to various embodiments, the producing of the third depth map may include identifying a spot point closest to the invalid pixel in the first depth map, and producing the third depth map by inputting image data of the identified spot point to the image data of the invalid pixel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an optical output circuitry;
an image sensor configured to receive a reflected light that originates from a light output by the optical output circuitry, and to obtain image data;
memory including one or more storage media and storing instructions; and
at least one processor operatively connected to the optical output circuitry, the image sensor, and the memory,
wherein the instructions, when executed by the at least one processor individually or collectively, cause the electronic device to:
control the optical output circuitry to output a spotlight at a first time point,
control the optical output circuitry to output a floodlight at a second time point,
produce a first depth map of a first object located at a distance farther than a certain distance based on first image data associated with a first reflected light that originates from the spotlight,
produce a second depth map of a second object located at a distance closer than the certain distance based on second image data associated with a second reflected light that originates from the floodlight, and
produce a third depth map based on the first depth map and the second depth map, and
wherein the first object is different from the second object.

2. The electronic device of claim 1, wherein the instructions, when executed by the at least one processor individually or collectively, further cause the electronic device to alternately switch the first time point at which the optical output circuitry outputs the spotlight and the second time point at which the optical output circuitry outputs the floodlight.

3. The electronic device of claim 2,
wherein the optical output circuitry comprises a lens part, and
wherein the instructions, when executed by the at least one processor individually or collectively, further cause the electronic device to control the lens part to output the spotlight at the first time point and to output the floodlight at the second time point.

4. The electronic device of claim 2, wherein the optical output circuitry further comprises:
a first light emitting element that outputs the spotlight, and
a second light emitting element that outputs the floodlight, and
wherein the instructions, when executed by the at least one processor individually or collectively, further cause the electronic device to:
control the first light emitting element to output the spotlight at the first time point, and
control the second light emitting element to output the floodlight at the second time point.

5. The electronic device of claim 4, wherein the first light emitting element includes a diffractive optics element via which the spotlight is output, and
wherein the second light emitting element includes a micro lens array via which the floodlight is output.

6. The electronic device of claim 1, wherein the instructions, when executed by the at least one processor individually or collectively, further cause the electronic device to:
produce the first depth map by performing noise filtering on the first image data, and
produce the second depth map by performing the noise filtering on the second image data.

7. The electronic device of claim 6, wherein the instructions, when executed by the at least one processor individually or collectively, further cause the electronic device to:
identify, based on an intensity of a portion of the first reflected light that is respectively received by each pixel in the first depth map, at least one spot point, and
produce, based on image data of the identified at least one spot point, the first depth map.

8. The electronic device of claim 1, wherein the instructions, when executed by the at least one processor individually or collectively, further cause the electronic device to:
identify an intensity of a portion of the second reflected light that is respectively received by each pixel in the second depth map,
obtain a reliability value of each pixel based on the identified intensity,
determine, as a valid pixel, a pixel of which the obtained reliability value is greater than or equal to a reference value, and
determine, as an invalid pixel, a pixel of which the obtained reliability value is less than the reference value.

9. The electronic device of claim 8, wherein the instructions, when executed by the at least one processor individually or collectively, further cause the electronic device to:
identify a spot point closest to the invalid pixel in the first depth map, and
produce the third depth map by inputting image data of the identified spot point to image data of the invalid pixel.

10. The electronic device of claim 1, wherein the instructions, when executed by the at least one processor individually or collectively, further cause the electronic device to:
identify an intensity of a portion of the second reflected light that is respectively received by each pixel in the second depth map, and
obtain a reliability value of each pixel based on the identified intensity.

11. The electronic device of claim 1, wherein the instructions, when executed by the at least one processor individually or collectively, further cause the electronic device to:
produce a composite depth map by using an image of the first object and an image of the second object, and
wherein the third depth map is produced by interpolating the composite depth map.

12. A method performed by an electronic device for improving far-field performance of a camera, the method comprising:
controlling, by at least one processor of the electronic device, an optical output circuitry of the electronic device to output a spotlight at a first time point;
controlling, by the at least one processor, the optical output circuitry to output a floodlight at a second time point;
producing, by the at least one processor, a first depth map of a first object located at a distance farther than a certain distance based on first image data associated with a first reflected light that originates from the spotlight;
producing, by the at least one processor, a second depth map of a second object located at a distance closer than the certain distance based on second image data associated with a second reflected light that originates from the floodlight; and
producing, by the at least one processor, a third depth map based on the first depth map and the second depth map,
wherein the first object is different from the second object.

13. The method of claim 12, further comprising:
alternatively switching the first time point at which the optical output circuitry outputs the spotlight and the second time point at which the optical output circuitry outputs the floodlight.

14. The method of claim 13, wherein the optical output circuitry further comprises a lens part, and
wherein the switching between the first time point and the second time point comprises controlling the lens part so as to output the spotlight at the first time point and to output the floodlight at the second time point.

15. The method of claim 13, wherein the optical output circuitry comprises:
a first light emitting element that outputs the spotlight, and
a second light emitting element that outputs the floodlight, and
wherein the switching between the first time point and the second time point comprises:
controlling a first light emitting element to output the spotlight at the first time point; and
controlling a second light emitting element to output the floodlight at the second time point.

16. The method of claim 15, wherein the spotlight output from the first light emitting element is output via a diffractive optics element, and
wherein the floodlight output from the second light emitting element is output via a micro lens array.

17. The method of claim 12, further comprising:
producing the first depth map by performing noise filtering on the first image data; and
producing the second depth map by performing the noise filtering on the second image data.

* * * * *